United States Patent
Urista et al.

(10) Patent No.: US 11,767,064 B2
(45) Date of Patent: Sep. 26, 2023

(54) SPRING-BIASED MUD FLAP HANGER WITH IMPROVED PIVOTING MOTION GUIDANCE

(71) Applicant: FlowBelow Aero, Inc., Round Rock, TX (US)

(72) Inventors: Roberto Urista, Austin, TX (US); Aditya Peri, Georgetown, TX (US); Joseph Peter Martin, Austin, TX (US); Benam Shrestha, Round Rock, TX (US)

(73) Assignee: FLOWBELOW AERO, INC., Round Rock, TX (US)

( * ) Notice: Subject to any disclaimer, the term of this patent is extended or adjusted under 35 U.S.C. 154(b) by 290 days.

(21) Appl. No.: 17/147,346

(22) Filed: Jan. 12, 2021

(65) Prior Publication Data
US 2022/0219761 A1 Jul. 14, 2022

(51) Int. Cl.
*B62D 25/16* (2006.01)
*B62D 25/18* (2006.01)

(52) U.S. Cl.
CPC ......... *B62D 25/163* (2013.01); *B62D 25/182* (2013.01); *B62D 25/188* (2013.01)

(58) Field of Classification Search
CPC .. B62D 25/182; B62D 25/188; B62D 25/166; B62D 25/168
See application file for complete search history.

(56) References Cited

U.S. PATENT DOCUMENTS

| | | | |
|---|---|---|---|
| 1,072,907 A | 9/1913 | Brooks |
| 1,173,434 A | 2/1916 | Johnson |
| 1,827,662 A | 10/1931 | Maas |
| 2,059,045 A | 10/1936 | Seymour |

(Continued)

FOREIGN PATENT DOCUMENTS

| | | |
|---|---|---|
| DE | 29922043 U1 | 8/2000 |
| DE | 102010063263 A1 | 6/2012 |

(Continued)

OTHER PUBLICATIONS

Bresnan, Exterior Accessories, Drink Water Trailer Sales, May 11, 2012, Pembroke, MA, retrieved from http://www.drinkwaterts.com on Jul. 25, 2012, 23 pgs.

(Continued)

*Primary Examiner* — Emma K Frick
(74) *Attorney, Agent, or Firm* — Sprinkle IP Law Group (57) ABSTRACT

Systems and methods for controlling movement of a mudflap hanger arm, to reliably return from a deflected position to a resting position, while providing improved manufacturability and reduced corrosion and wear through the use of guidance surfaces on a mounting plate and a frame seat that form the interface between the hanger arm and a vehicle frame. When the hanger arm pivots about an axis on one side of the mounting plate and frame seat, guidance surfaces on the opposite side are in contact or near-contact, preventing the mounting plate and frame seat from being laterally displaced or rotated with respect to each other. The improved mounting plate and frame seat can reduce or eliminate manufacturing operations such as welding, coating, etc., reducing the cost of the apparatus, while enhancing manufacturability and operation.

19 Claims, 7 Drawing Sheets

(56) References Cited

U.S. PATENT DOCUMENTS

| | | | |
|---|---|---|---|
| 2,190,117 A | 3/1939 | Griffith | |
| 2,538,839 A | 1/1951 | Limberg | |
| 2,579,048 A | 12/1951 | Paul | |
| 2,605,119 A | 7/1952 | Earnest | |
| 2,715,430 A | 8/1952 | Lindeman | |
| 2,652,266 A * | 9/1953 | Miller | B62D 25/188 280/851 |
| 2,685,906 A | 8/1954 | Williams | |
| 2,931,414 A | 4/1956 | Jankowski | |
| 2,801,867 A | 8/1957 | Childreth | |
| 2,869,929 A | 1/1959 | Hurd | |
| 3,006,658 A | 10/1961 | Wenham et al. | |
| 3,078,124 A | 2/1963 | Mulder | |
| 3,092,420 A | 6/1963 | Baldwin et al. | |
| 3,215,384 A | 11/1965 | Chambers | |
| 3,224,791 A * | 12/1965 | Sogoian | B62D 25/188 280/851 |
| 3,276,502 A | 10/1966 | Walter | |
| 3,276,503 A | 10/1966 | Kilmarx | |
| 3,279,815 A | 10/1966 | Hutchens | |
| 3,317,247 A | 5/1967 | Lamme | |
| 3,350,113 A | 10/1967 | Graham | |
| 3,367,722 A | 2/1968 | Miyanaga | |
| 3,401,953 A | 9/1968 | Prohl | |
| 3,582,108 A | 6/1971 | Carlton | |
| 3,585,824 A | 6/1971 | Schenk et al. | |
| 3,653,455 A | 4/1972 | Hetteen | |
| 3,752,498 A | 8/1973 | Shea | |
| 3,848,842 A * | 11/1974 | Jepsen | B62D 25/188 267/71 |
| 3,874,697 A | 4/1975 | Thompson | |
| 3,918,764 A | 11/1975 | Lamme | |
| 3,940,165 A * | 2/1976 | Sogoian | B62D 25/188 280/851 |
| 3,947,065 A | 3/1976 | Geiger | |
| 3,954,281 A | 5/1976 | Juergens | |
| 4,007,944 A | 2/1977 | Dingess | |
| 4,138,129 A | 2/1979 | Morris | |
| 4,169,608 A | 10/1979 | Logan | |
| 4,180,230 A | 12/1979 | Sogoian | |
| 4,205,861 A | 6/1980 | Roberts | |
| 4,235,476 A | 11/1980 | Arvidsson | |
| 4,334,694 A | 6/1982 | Iwanicki | |
| 4,436,319 A | 3/1984 | Clutter | |
| 4,441,539 A | 4/1984 | Hulse | |
| 4,582,107 A | 4/1986 | Scully | |
| 4,619,303 A | 10/1986 | Bryan et al. | |
| 4,627,594 A * | 12/1986 | Reed | B62D 25/188 248/632 |
| 4,627,631 A | 12/1986 | Sherman | |
| 4,640,331 A | 2/1987 | Braun et al. | |
| 4,641,698 A | 2/1987 | Bitoni | |
| 4,678,017 A | 7/1987 | Schultz | |
| 4,706,980 A | 11/1987 | Hawes et al. | |
| 4,724,879 A | 2/1988 | Schultz et al. | |
| 4,730,952 A | 3/1988 | Wiley | |
| 4,735,428 A | 4/1988 | Antekeier | |
| 4,744,399 A | 5/1988 | Magnuson et al. | |
| 4,754,792 A | 7/1988 | Braun et al. | |
| 4,761,040 A | 8/1988 | Johnson | |
| 4,770,330 A | 9/1988 | Bondstead et al. | |
| 4,784,430 A | 11/1988 | Biermacher | |
| 4,836,568 A | 6/1989 | Preslik et al. | |
| 4,860,579 A | 8/1989 | Beverly | |
| 4,889,394 A | 12/1989 | Ruspa | |
| 4,892,128 A | 1/1990 | Bartos | |
| 4,895,199 A | 1/1990 | Magnuson et al. | |
| 4,921,276 A | 5/1990 | Morin | |
| 4,925,235 A | 5/1990 | Fingerle | |
| 4,960,294 A * | 10/1990 | Leonard | B62D 25/188 280/848 |
| 4,961,611 A | 10/1990 | Patti | |
| D312,609 S | 12/1990 | Preslik et al. | |
| D312,810 S | 12/1990 | Preslik et al. | |
| 4,974,909 A | 12/1990 | Patti et al. | |
| 4,981,162 A | 1/1991 | Grenie | |
| 4,984,851 A | 1/1991 | Hayano | |
| 5,074,573 A | 12/1991 | Dick | |
| 5,179,981 A | 1/1993 | Hickes et al. | |
| 5,190,354 A | 3/1993 | Levy et al. | |
| 5,192,108 A | 3/1993 | Richardson et al. | |
| 5,238,268 A | 8/1993 | Logan | |
| 5,240,039 A | 8/1993 | Colussi et al. | |
| 5,257,822 A | 11/1993 | Metcalf | |
| 5,263,770 A | 11/1993 | Goudey | |
| 5,269,547 A | 12/1993 | Antekeier | |
| 5,280,990 A | 1/1994 | Rinard | |
| 5,286,049 A | 2/1994 | Khan | |
| D345,332 S | 3/1994 | Roman | |
| 5,294,189 A | 3/1994 | Price et al. | |
| 5,324,099 A | 6/1994 | Fitzhugh | |
| 5,332,280 A | 7/1994 | Dupont et al. | |
| 5,340,154 A | 8/1994 | Scott | |
| 5,358,313 A | 10/1994 | Polka | |
| 5,366,278 A | 11/1994 | Brumfield | |
| 5,375,882 A | 12/1994 | Koch, III | |
| 5,380,028 A | 1/1995 | Ferris | |
| 5,398,743 A | 3/1995 | Bartos | |
| D361,974 S | 9/1995 | Hornik | |
| 5,465,772 A | 11/1995 | Sartor | |
| 5,490,342 A | 2/1996 | Rutterman et al. | |
| 5,538,062 A | 7/1996 | Stech | |
| 5,584,949 A | 12/1996 | Ingram | |
| 5,623,777 A | 4/1997 | Hsiao et al. | |
| D381,949 S | 8/1997 | Barrett, Jr. et al. | |
| 5,659,989 A | 8/1997 | Hsiao et al. | |
| D395,268 S | 6/1998 | Tucker | |
| 5,769,979 A | 6/1998 | Naedler | |
| 5,791,741 A | 8/1998 | Sheu | |
| 5,833,254 A | 11/1998 | Bucho | |
| 5,836,399 A | 11/1998 | Maiwald et al. | |
| 5,850,727 A | 12/1998 | Fox | |
| 5,871,335 A | 2/1999 | Bartlett | |
| 5,884,981 A | 3/1999 | Ichikawa | |
| 5,938,222 A | 8/1999 | Huang | |
| 5,947,520 A | 9/1999 | McHorse | |
| 6,045,195 A | 4/2000 | Okamoto | |
| 6,070,893 A | 6/2000 | Thorndyke et al. | |
| 6,070,908 A | 6/2000 | Skrzypchak | |
| 6,105,645 A | 8/2000 | Ingram | |
| 6,120,104 A | 9/2000 | Okamoto et al. | |
| 6,152,469 A | 11/2000 | Gadowski | |
| 6,219,987 B1 | 4/2001 | Trent et al. | |
| 6,244,316 B1 | 6/2001 | Naedler | |
| 6,367,841 B1 | 4/2002 | Matthew | |
| 6,401,743 B1 | 6/2002 | Naedler | |
| 6,412,799 B1 | 7/2002 | Schrempf | |
| 6,416,112 B1 | 7/2002 | Trivits | |
| 6,427,739 B1 | 8/2002 | Medsker | |
| 6,431,605 B1 | 8/2002 | Miller et al. | |
| 6,435,462 B1 | 8/2002 | Hawes | |
| 6,443,492 B1 | 9/2002 | Barr | |
| 6,443,529 B1 | 9/2002 | Williams | |
| 6,604,724 B2 * | 8/2003 | Hawes | B62D 25/182 280/848 |
| 6,648,373 B2 | 11/2003 | Hawes | |
| 6,666,498 B1 | 12/2003 | Whitten | |
| 6,698,482 B2 | 3/2004 | Hennig | |
| 6,786,512 B2 | 9/2004 | Morin et al. | |
| 6,857,709 B1 | 2/2005 | McLean et al. | |
| 6,886,862 B2 | 5/2005 | Matthew | |
| 6,979,050 B2 | 12/2005 | Browne et al. | |
| 7,011,428 B1 | 3/2006 | Hand | |
| 7,081,081 B2 | 7/2006 | Schutz et al. | |
| 7,083,179 B2 | 8/2006 | Chapman et al. | |
| 7,093,909 B2 | 8/2006 | Korpi et al. | |
| 7,131,705 B1 | 11/2006 | DelVecchio et al. | |
| 7,249,804 B2 | 7/2007 | Zank et al. | |
| 7,466,049 B1 | 12/2008 | Vancea | |
| 7,484,736 B2 | 2/2009 | Allemann et al. | |
| 7,520,534 B2 | 4/2009 | Longchamp | |
| 7,530,379 B1 | 5/2009 | Becker et al. | |
| 7,547,076 B2 | 6/2009 | Necaise | |

(56) References Cited

U.S. PATENT DOCUMENTS

| | | | |
|---|---|---|---|
| D607,200 S | 1/2010 | Prater | |
| 7,651,108 B2 | 1/2010 | Bonnaud et al. | |
| 7,658,251 B2 | 2/2010 | James | |
| 7,669,678 B2 | 3/2010 | Benedict et al. | |
| 7,775,374 B1 | 8/2010 | Barker et al. | |
| 7,775,604 B2 | 8/2010 | Chen | |
| 7,806,464 B2 | 10/2010 | Cardolle | |
| 7,909,343 B2 | 3/2011 | Archer | |
| 7,931,302 B2 | 4/2011 | Vaughn | |
| 7,963,159 B2 | 6/2011 | Ingram et al. | |
| 7,975,739 B1 | 7/2011 | Ingram | |
| 8,011,848 B2 | 9/2011 | Sockman et al. | |
| 8,028,732 B1 | 10/2011 | Ingram et al. | |
| 8,118,329 B2 | 2/2012 | Braga | |
| 8,177,286 B2 * | 5/2012 | Brown | B62D 35/02 296/180.4 |
| 8,251,436 B2 | 8/2012 | Henderson et al. | |
| 8,342,595 B2 | 1/2013 | Henderon et al. | |
| 8,353,375 B2 | 1/2013 | James | |
| 8,382,210 B1 | 2/2013 | Fleck | |
| 8,424,956 B2 | 4/2013 | Stimel | |
| 8,517,474 B2 | 8/2013 | Salah | |
| 8,540,304 B2 | 9/2013 | Kint | |
| 8,567,802 B2 | 10/2013 | Barron | |
| 8,573,671 B2 | 11/2013 | Watkins | |
| 8,726,958 B2 | 5/2014 | Merrill | |
| 8,746,305 B2 | 6/2014 | Lloyd | |
| 8,747,084 B2 | 6/2014 | Richardson et al. | |
| 8,763,661 B2 | 7/2014 | Richardson | |
| 8,814,253 B1 | 8/2014 | Butler et al. | |
| 8,870,275 B1 | 10/2014 | Schmidt | |
| 8,955,626 B2 | 2/2015 | Trueman | |
| 9,027,983 B2 | 5/2015 | Butler et al. | |
| 9,039,386 B2 | 5/2015 | Richardson et al. | |
| 9,039,392 B2 | 5/2015 | Richardson et al. | |
| 9,074,595 B2 | 7/2015 | Richardson | |
| 9,080,565 B2 | 7/2015 | Richardson | |
| 9,121,401 B2 | 9/2015 | Richardson | |
| 9,145,887 B2 | 9/2015 | Richardson | |
| 9,151,288 B2 | 10/2015 | Richardson | |
| 9,222,473 B2 | 12/2015 | Richardson | |
| 9,308,949 B1 | 4/2016 | Mihelic et al. | |
| 9,321,302 B2 | 4/2016 | Fleck | |
| 9,327,550 B2 | 5/2016 | Butler et al. | |
| 9,429,243 B2 | 8/2016 | Hessling et al. | |
| 9,604,157 B2 | 3/2017 | Richardson | |
| 9,637,184 B1 | 5/2017 | Bennett | |
| 9,663,157 B2 | 5/2017 | Butler et al. | |
| 9,815,506 B2 | 11/2017 | Vogel et al. | |
| 9,821,598 B2 | 11/2017 | Fleck | |
| 9,868,318 B2 | 1/2018 | Becker | |
| 10,252,755 B2 | 4/2019 | Butler et al. | |
| 10,293,872 B2 | 5/2019 | Butler et al. | |
| 10,343,450 B2 | 7/2019 | Butler et al. | |
| 10,482,565 B1 | 11/2019 | Chen | |
| 10,654,529 B2 | 5/2020 | Butler | |
| 10,710,649 B2 | 7/2020 | Butler et al. | |
| 10,882,571 B2 | 1/2021 | Butler | |
| 11,110,974 B2 | 9/2021 | Cosme | |
| 11,220,132 B2 | 1/2022 | Butler | |
| 11,254,383 B1 | 2/2022 | Butler | |
| 11,283,988 B2 | 3/2022 | Butler | |
| 11,352,073 B2 | 6/2022 | Butler | |
| 11,492,053 B2 | 11/2022 | Butler | |
| 11,560,184 B2 | 1/2023 | Butler | |
| 11,667,338 B2 | 6/2023 | Butler | |
| 2002/0124926 A1 | 9/2002 | Colussi et al. | |
| 2004/0164539 A1 | 8/2004 | Bernard | |
| 2004/0238093 A1 | 12/2004 | Nelson et al. | |
| 2005/0133134 A1 | 6/2005 | Ingram et al. | |
| 2005/0146151 A1 | 7/2005 | Walker | |
| 2006/0179929 A1 | 8/2006 | Becker | |
| 2008/0129079 A1 | 6/2008 | Plett | |
| 2008/0257620 A1 | 10/2008 | Poulsen | |
| 2009/0273176 A1 | 11/2009 | Ulgen | |
| 2009/0283190 A1 | 11/2009 | Padula et al. |
| 2010/0066123 A1 | 3/2010 | Ortega et al. |
| 2010/0066155 A1 | 3/2010 | Seradarian et al. |
| 2010/0117396 A1 | 5/2010 | Dayton |
| 2011/0011656 A1 | 1/2011 | Poulsen |
| 2011/0057410 A1 | 3/2011 | Eklund et al. |
| 2011/0089748 A1 | 4/2011 | Grill et al. |
| 2011/0101767 A1 | 5/2011 | Fleck |
| 2011/0253851 A1 | 10/2011 | Di Franco |
| 2011/0272963 A1 | 11/2011 | Henderson et al. |
| 2011/0272964 A1 | 11/2011 | Henderson et al. |
| 2011/0284602 A1 | 11/2011 | Lamouroux |
| 2012/0013146 A1 | 1/2012 | Wolf et al. |
| 2012/0024445 A1 | 2/2012 | Wilson et al. |
| 2012/0043803 A1 | 2/2012 | Grill |
| 2012/0256438 A1 | 10/2012 | Watkins |
| 2013/0049320 A1 | 2/2013 | Smith |
| 2013/0068361 A1 | 3/2013 | Flory et al. |
| 2013/0076107 A1 | 3/2013 | Stames |
| 2013/0087262 A1 | 4/2013 | Hennig |
| 2013/0199685 A1 | 8/2013 | Nelson et al. |
| 2014/0284994 A1 | 9/2014 | Polka |
| 2015/0059946 A1 | 3/2015 | Keeney |
| 2015/0151569 A1 | 6/2015 | Fleck |
| 2015/0175089 A1 | 6/2015 | Reed |
| 2015/0321336 A1 | 11/2015 | Harrison |
| 2015/0329152 A1 | 11/2015 | Baker et al. |
| 2016/0096557 A1 | 4/2016 | Bassily et al. |
| 2016/0141934 A1 | 5/2016 | Click |
| 2016/0221388 A1 | 8/2016 | Van Oort |
| 2016/0288590 A1 | 10/2016 | Hennig et al. |
| 2016/0368545 A1 | 12/2016 | Vogel et al. |
| 2017/0029044 A1 | 2/2017 | Senatro |
| 2017/0129549 A1 | 5/2017 | Polgrean |
| 2017/0166266 A1 | 6/2017 | Wall, II |
| 2017/0240220 A1 | 8/2017 | Kron |
| 2018/0072354 A1 | 3/2018 | Cosme et al. |
| 2018/0104994 A1 | 4/2018 | Lin |
| 2018/0312115 A1 | 11/2018 | Reed |
| 2018/0370580 A1 | 12/2018 | Butler et al. |
| 2019/0061838 A1 | 2/2019 | Lee |
| 2019/0152409 A1 | 5/2019 | Klatt et al. |
| 2019/0270335 A1 | 9/2019 | Butler |
| 2020/0047824 A1 | 2/2020 | Butler |
| 2020/0062048 A1 | 2/2020 | Butler |
| 2020/0114983 A1 | 4/2020 | Cosme et al. |
| 2020/0156555 A1 | 5/2020 | Reed |
| 2020/0164933 A1 | 5/2020 | Butler et al. |
| 2020/0262493 A1 | 8/2020 | Butler |
| 2020/0339201 A1 | 10/2020 | Butler |
| 2021/0009209 A1 | 1/2021 | Senatro |
| 2021/0139086 A1 | 5/2021 | Andrus |
| 2021/0197902 A1 | 7/2021 | Butler |
| 2022/0097779 A1 | 3/2022 | Senatro |
| 2022/0161594 A1 | 5/2022 | Butler |
| 2023/0249762 | 8/2023 | Butler |

FOREIGN PATENT DOCUMENTS

| | | |
|---|---|---|
| EP | 542728 | 7/1988 |
| EP | 0 309 611 A1 | 4/1989 |
| EP | 0 310 130 A1 | 4/1989 |
| GB | 2348400 | 10/2000 |
| GB | 2524173 | 9/2016 |
| WO | WO 1997/48590 | 12/1997 |
| WO | WO 2004/062953 | 7/2004 |
| WO | WO 2008/100338 | 8/2008 |
| WO | WO 2009105623 | 8/2009 |
| WO | WO 2013/174410 | 11/2013 |
| WO | WO 2016/134847 | 9/2016 |
| WO | WO 2018/136529 | 7/2018 |

OTHER PUBLICATIONS

Truck Accessories, Council Hitch Truck Accessories, Council Bluffs, IA, retrieved on Jul. 24, 2012 from <http://councilhitch.com/vehicle-accessories/truck-accessories/> 1 pg.

(56) References Cited

OTHER PUBLICATIONS

AMP Research PowerStep™, AMP Research, 2011, Tustin, CA, retrieved on Jul. 24, 2012 from <http://www.amp-research.com/products/truckaccessories/powerstep/>, 6 pgs.
TrailBack Aluminium Running Boards, BuyAutoTruckAccessories.com, 2012, Clifton, NJ, retrieved on Jul. 24, 2012, from <http://www.buyautotruckaccessories.com>, 2 pgs.
Discount Auto Parts Dee Zee Running Boards Car Truck SUV, Dee Zee, Inc., Des Moines, IA, retrieved on Jul. 24, 2012, from <http://www.running-board.nedona.org>, 6 pgs.
Lund Trailrunner Extruded Aluminum Running Boards, JC Whitney, 2012, LaSalle, IL, retrieved on Jul. 25, 2012, from <http://www.jcwhitney.com>, 3 pgs.
Endeavor Running Boards, 4WheelOnline.com, Tampa, FL, retrieved on Jul. 28, 2012, from <http://4wheelonline.com/EndeavourRunningBoards.64146>, 2 pgs.
Deflecktor®, The First-Of-Its-Kind Aeroelynamic Wheel Cover, A de F, Ltd., Birchwood, MN, retrieved from http://www.deflecktor.com/DeflecktorBrochure.pdf, 15 pgs.
International Search Report and Written Opinion for PCT Application No. PCT/US2012/046010, completed Sep. 11, 2012 and dated Oct. 1, 2012, 10 pgs.
Office Action for U.S. Appl. No. 13/452,249, dated Apr. 19, 2013, 11 pgs.
Truck Accessories, Council Hitch Truck Accessories, Council Bluffs, IA, retrieved on May 15, 2013, from <http://councilhitch.com/vehicle-accessories/truck-accessories/>, 5 pgs.
Office Action for U.S. Appl. No. 13/452,249, dated Sep. 9, 2013, 9 pgs.
International Preliminary Report on Patentability (Ch. I) for International Application No. PCT/US2012/046010, dated Jan. 23, 2014, 9 pgs.
International Search Report and Written Opinion for International Patent Application No. PCT/US13/68119, dated Jun. 5, 2014, 10 pgs.
Isuzu NPR Splash Shield/Mud Flap 1989-Up, Busbee's Trucks & Parts Product Information Page, BusbeeTruckParts's Photostream, Flickr, uploaded Nov. 12, 2010, retrieved on Feb. 25, 2014, from <www.flickr.com/photos/busbeetruckparts/5169791014/in/photostream/>, 1 pg.
Office Action for U.S. Appl. No. 14/070,294, dated Sep. 17, 2014, 8 pgs.
Extended European Search Report for Application No. EP 12811575.5, dated Mar. 4, 2015, 8 pgs.
Office Action for U.S. Appl. No. 13/545,100, dated Apr. 10, 2015, 15 pgs.
International Preliminary Report on Patentability (Ch. I) for Application No. PCT/US2013/068119, dated May 14, 2015, 7 pgs.
Office Action for U.S. Appl. No. 13/545,100, dated Sep. 21, 2015, 8 pgs.
Office Action for U.S. Appl. No. 14/666,019, dated Jul. 8, 2016, 7 pgs.
Extended European Search Report for Application No. EP 13851505.1, dated Oct. 14, 2016, 8 pgs.
Examination Report for Australian Application No. 2013337652, dated Jan. 13, 2017, 4 pgs.
Office Action for U.S. Appl. No. 15/082,996, dated Apr. 3, 2018, 25 pgs.
Office Action for Canadian Application No. 2,877,482, dated May 14, 2018, 4 pgs.
Office Action for U.S. Appl. No. 15/491,477, dated Aug. 14, 2018, 7 pgs.
Office Action for U.S. Appl. No. 15/553,893, dated Jul. 19, 2018, 7 pgs.
Office Action for U.S. Appl. No. 16/018,413, dated Sep. 18, 2018, 6 pgs.
Office Action for U.S. Appl. No. 15/082,996, dated Nov. 2, 2018, 6 pgs.
Office Action for U.S. Appl. No. 15/553,893, dated Feb. 25, 2019, 6 pgs.
Office Action for U.S. Appl. No. 16/290,631, dated Jun. 25, 2019, 7 pgs.
Office Action for European Patent Application No. 12811575.5, dated Jun. 28, 2019, 6 pgs.
VIGIA Tire Pressure Systems brochure, Colven, retrieved from <http://www.vigia.ca/images/Pdf/Vigia_external_brochure.pdf>, captured Nov. 5, 2017, 4 pgs.
Non-patent literature illustrating parts_hollow.jpg, Colven, retrieved from <http://vigia.ca/webshop/images/categories/parts_hollow.jpg>, captured Nov. 5, 2017, 1 pg.
International Search Report for PCT Application No. PCT/US17/60242, dated Mar. 1, 2018, 4 pgs.
Written Opinion for PCT Application No. PCT/US17/60242, dated Mar. 1, 2018, 6 pgs.
Office Action for U.S. Appl. No. 16/017,591, dated Sep. 4, 2019, 8 pgs.
Office Action for U.S. Appl. No. 16/290,631, dated Oct. 2, 2019, 9 pgs.
Office Action for U.S. Appl. No. 16/049,367, dated Dec. 12, 2019, 8 pgs.
European Office Action for Patent Application No. 12811575.5 dated May 18, 2020, 5 pgs.
European Partial Search Report for Patent Application No. 17866894.3 dated Jun. 12, 2020, 12 pgs.
European Office Action for Patent Application No. 13851505.1, dated Jun. 12, 2020, 5 pgs.
Office Action for Canadian Patent Application No. 2890183, dated Jun. 25, 2020, 4 pgs.
Office Action for U.S. Appl. No. 16/049,367, dated Jul. 23, 2020, 8 pgs.
Office Action for U.S. Appl. No. 15/553,893, dated Apr. 16, 2020, 8 pgs.
Office Action for U.S. Appl. No. 15/553,893, dated Aug. 31, 2020, 9 pgs.
Office Action for U.S. Appl. No. 16/710,623, dated Oct. 6, 2020, 8 pgs.
Extended European Search Report for Patent Application No. 17866894.3, dated Oct. 9, 2020, 11 pgs.
Office Action for U.S. Appl. No. 16/415,875, dated Jan. 15, 2021, 14 pgs.
Office Action for European Patent Application No. 13851505.1, dated Feb. 10, 2021, 4 pgs.
Office Action for U.S. Appl. No. 16/466,268, dated May 19, 2022, 8 pgs.
European Search Report for European Application No. 212163497, dated Jun. 15, 2022, 7 pgs.
Notice of Allowance for U.S. Appl. No. 17/139,858, dated Jun. 24, 2022, 6 pgs.
Fleet Engineers Product Catalog 2017, Mud Flap Brackets, at pp. 51-66, retrieved Jan. 12, 2021 at <<https://fleetengineers.s3.amazonaws.com/uploads/2017/10/FE2017-ProdCat-101317-web.pdf>>, 228 pgs.
Notice of Allowance for U.S. Appl. No. 16/657,824, dated Jul. 19, 2021, 6 pgs.
Office Action for U.S. Appl. No. 16/466,268, dated Jan. 11, 2023, 9 pgs.
Notice of Allowance for U.S. Appl. No. 16/874,060, dated Feb. 9, 2023, 4 pgs.
Notice of Allowance for U.S. Appl. No. 17/716,865, dated Oct. 7, 2022, 6 pgs.
Office Action for U.S. Appl. No. 17/534,647, dated Nov. 9, 2022, 9 pgs.
Office Action for U.S. Appl. No. 16/415,875, dated May 24, 2021, 7 pgs.
International Search Report and Written Opinion for International Application No. PCT/US18/41907, dated Dec. 20, 2018, 8 pgs.
European Search Report for European Patent Application No. 18832450.3, dated Mar. 10, 2021, 7 pgs.
Office Action for U.S. Appl. No. 16/466,268, dated Sep. 20, 2021, 13 pgs.
Extended European Search Report for Patent Application No. 21171821.8, dated Oct. 4, 2021, 8 pgs.

(56) References Cited

OTHER PUBLICATIONS

Office Action for U.S. Appl. No. 16/630,318, dated Dec. 17, 2021, 15 pgs.
Office Action for U.S. Appl. No. 16/874,060, dated Sep. 14, 2022, 7 pgs.
Notice of Allowance for U.S. Appl. No. 16/630,318, dated Apr. 6, 2022, 6 pgs.
Office Action for European Patent Application No. 188324503, dated May 11, 2023, 6 pgs.
Office Action for European Patent Application No. 178668943, dated Mar. 9, 2023, 5 pgs.
Office Action for U.S. Appl. No. 17/534,647, dated Apr. 12, 2023, 13 pgs.
Office Action for European Patent Application No. 21171821.8, dated May 10, 2023, 6 pgs.
Ex Parte Quayle Action issued in U.S. Appl. No. 16/466,268, dated Jun. 1, 2023, 5 pages.

* cited by examiner

SPRING-BIASED MUD FLAP HANGER WITH IMPROVED PIVOTING MOTION GUIDANCE

TECHNICAL FIELD

This disclosure relates generally to mudflap assemblies for vehicles, and more particularly to systems and methods for manufacturing and using a mudflap hanger assembly which controls the positioning of a hanger arm at an interface with a vehicle frame mount.

BACKGROUND

Mudflaps are commonly used on heavy duty trucks and trailers to deflect mud and other debris on a road surface which is thrown into the air by the rotating tire. A mudflap is typically made from a durable, flexible material such as rubber to withstand impacts from flying debris, or contact with the tire or the road surface. Mudflaps are typically installed on a mudflap hanger arm with extends outward from the frame of the truck or trailer to allow the mudflap to hang down behind the tire.

Because mudflap assemblies (including the hanger arms and mudflaps) are frequently subjected to deflecting forces (for example, a mudflap assembly may be hit by a high curb or other object), features have been developed to allow the assemblies to withstand these deflecting forces while reducing the damage that might result from the deflection of the assemblies. The mudflap hanger arm, for instance, may be spring loaded so that it can flex away from its normal horizontal position when a deflecting force is applied to it, and then return to its normal position when the force is removed.

Current designs for spring loaded mudflap hanger arms, however, have a number of shortcomings. For example, when a conventional mudflap hanger arm is deflected, it may bind or fail to return to its normal position. This problem may be aggravated by the fact that the physical configurations of the components at the interface between the hanger arm and the vehicle frame are limited to geometries that are capable of being manufactured using traditional manufacturing processes such as metal fabrication and casting. Further, conventional spring loaded mudflap hangers are prone to corrosion, primarily in the components at the interface between the hanger arm and the vehicle frame. It would therefore be desirable to provide improved designs for spring loaded mudflap assemblies that reduce or eliminate one or more of these problems.

SUMMARY

The present disclosure details systems, methods and products for controlling the positioning of a mudflap hanger arm, including during deflection of the hanger arm to enable the hanger arm to reliably return from a deflected position to a normal position, while providing improved manufacturability and reduced corrosion and wear. Embodiments of the invention provide these advantages through the use of guidance surfaces on a mounting plate and a frame seat that form the interface between the hanger arm and the vehicle frame. When the hanger arm pivots about an axis on one side of the mounting plate and frame seat, guidance surfaces on the opposite sides of the mounting plate and frame seat are in contact or near-contact, thereby preventing the mounting plate and frame seat from being laterally displaced from each other, or being rotated with respect to each other (generally about the longitudinal axis of the hanger arm). By maintaining alignment of the mounting plate and frame seat in this manner, the deflected hanger arm can reliably return to its normal, fully seated position. In maintaining alignment of the mounting plate and frame seat, the guidance surfaces also reduce wear between these components.

One embodiment comprises a mudflap hanger apparatus which is adapted to be mounted on the frame of a vehicle to hold a mudflap in position behind one or more wheels of the vehicle. The apparatus includes a hanger arm assembly with a hanger arm and a mounting plate connected to a proximal end of the hanger arm (the end which will be closest to the point at which the assembly is mounted on the vehicle frame). The apparatus also includes a frame seat which is configured to movably engage the mounting plate and a high-tension spring which is coupled to both the hanger arm assembly and the frame seat, so that the spring biases the mounting plate toward a resting position against the frame seat and thereby biases the hanger arm toward a resting, undeflected position. A mud flap may be attached to the hanger arm so that it extends downward from the hanger arm behind the wheel(s) of the vehicle. When a lateral force is applied to the hanger arm, the mounting plate pivots against the frame seat at one of a plurality of pivot axes, enabling the hanger arm to move angularly away from the resting, undeflected position. Each of the mounting plate and the frame seat has one or more corresponding guidance surfaces, where the guidance surfaces of the mounting plate oppose the guidance surfaces of the frame seat. So that when the mounting plate pivots against the frame seat, the guidance surfaces cause the mounting plate to move along a corresponding guided pivot path.

In one embodiment, the hanger arm comprises a tubular structure having an opening in its proximal end, where a portion of the mounting plate extends into the hanger arm so that the hanger arm surrounds and supports the portion of the mounting plate extending into the hanger arm. The portion of the mounting plate extending into the hanger arm may include at least a portion of the one or more guidance surfaces of the mounting plate. In the resting position, the frame seat may have at least a portion of its guidance surfaces extend into the hanger arm.

In some embodiments, when the mudflap hanger apparatus is in the resting position, a first resting surface of the mounting plate is fully seated against a second resting surface of the frame seat, and the hanger arm extends distally from the frame seat in a longitudinal direction. The resting surface of the mounting plate and the resting surface of the frame seat may be substantially planar surfaces. In some embodiments, each of the first and second resting surfaces includes a planar portion, with one of the first and second resting surfaces including a protrusion on a lower end of the resting surface and the other of the first and second resting surfaces including a recess which is complementary to the protrusion, where the mounting plate is configured to pivot about the protrusion while the protrusion remains seated within the recess.

In some embodiments, for each of the plurality of pivot axes, each of the mounting plate and the frame seat has a corresponding guidance surface on the sides of the mounting plate and frame seat opposite the pivot axis. The corresponding guidance surfaces of the mounting plate and the frame seat may have complementary curved surfaces, where each of the guidance surfaces has a radius of curvature equal to the distance between the pivot axis and the corresponding guidance surface.

In some embodiments, the hanger arm comprises a metal extrusion, while the mounting plate comprises a thermoplastic material. The hanger arm may comprise a tubular structure, where the mounting plate has an inner extension that extends distally into a proximal end of the tubular structure and an outer extension that extends distally exterior to the proximal end of the tubular structure, with a slot formed between the inner and outer extensions and the proximal end of the tubular structure positioned within the slot. Each of the mounting plate, as well as the frame seat, may comprise an injection molded plastic component.

In some embodiments, the frame seat is connected to a D ring and a D ring mount, where the D ring mount secures the D ring to the frame seat and a vehicle frame, and where the D ring secures a proximal end of the spring to the frame seat and the vehicle frame. The mounting plate may have an aperture or opening through it, where either the D ring or the spring (or both) extends through the opening in the mounting plate. The opposite, distal end of the spring may be secured within the interior of the hanger arm by a bolt that extends laterally through the hanger arm. As an alternative to the D ring, some embodiments may have a U-bolt that extends through the frame seat and secures the frame seat and the proximal end of the spring to the vehicle frame.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Mudflap brackets having a horizontal tube with longitudinal mudflap mounting flanges on their undersides are known. Such brackets comprise a vehicle frame-mounted plate having bolts or studs of a predetermined, fixed separation, often selected to match existing manufacturer provided apertures in the vehicle frame. Commonly, mudflap assemblies have the ability to flex in horizontal and vertical directions in order to withstand forces placed upon them during normal operation.

Some mudguard mounting structures comprise a single piece of spring-like bar stock bent in a shape for supporting the mudguards and for flexing in all directions. Other mounting assemblies for mudflaps use a rigid hanger assembly and resiliently bias the hanger assembly to a seat which is attached to a vehicle. In such assemblies, devices are sometimes provided for restraining rotational movement of the hanger assembly with respect to the seat in an effort to maintain the mudflap in its proper orientation. If the hanger rotates so that the flap moves toward the wheels, the wheels may prematurely wear the mudflap away. If the hanger rotates in an opposite direction, the effectiveness of the mudflap may be diminished.

As noted above, spring loaded mudflap assemblies have been developed to better withstand deflections that occur when forces are applied to the mudflap hanger arm and/or the mudflap itself. A typical spring loaded mudflap assembly includes an elongated tubular hanger arm which has a high-tension spring positioned inside. One end of the spring is secured to a point within the tubular hanger arm, and the other end of the spring is extends to a proximal end of the hanger arm which is adjacent to the vehicle (e.g., a truck or trailer) frame. This second end of the spring is secured to the frame of the vehicle to bias the hanger arm against the frame (i.e., to pull the hanger toward the frame and hold it in place against the frame. The spring is intended to hold a proximal end of the horizontal hanger arm against a frame-mounted seat, generally in an abutting relationship. When the hanger arm is deflected, it pulls the spring, increasing the tension on the spring. The spring then pulls the hanger back to its normal seated position against the and frame.

"Proximal", as used herein, refers to the end of the hanger arm or spring which is nearest to the location on the vehicle frame at which the mudflap assembly is mounted. Conversely, "distal" is used herein to refers to the end of the hanger arm or spring which is farthest from the location on the vehicle frame at which the mudflap assembly is mounted.

In a conventional spring loaded mudflap assembly, the hanger arm is metal (typically steel), and the mounting plate is welded to the proximal end of the hanger arm. The frame seat which provides the surface against which the mounting plate of the hanger arm rests when the hanger arm is in its normal, undeflected position commonly has a flat contact surface that allows a flat surface of the mounting plate to rest against it when the hanger arm is in the undeflected position.

The frame seat may have features such as angled edges around its periphery which are designed to center the mounting plate with respect to the frame seat. Alternatively, the mounting plate and frame seat may have indexing features that are designed to hold the hanger arm in an aligned position.

While existing spring loaded mudflap assemblies may incorporate these features to try to maintain the proper positioning of the hanger arm assembly, they may have a number of disadvantages. For instance, the angled edges or corners on the mounting plate or the frame seat may catch or hang up on each other, preventing realignment of the hanger arm. This may require greater spring-tensioning force to try to overcome this catching. Further, because the mounting plate and frame seat are conventionally made of metal, it is typically necessary to provide a protective coating on the metal components to prevent wear and corrosion of the components. Adding the alignment features, welding the mounting plate to the hanger arm, and providing the protective coating for the metal mounting plate and frame seat requires additional manufacturing steps that are not necessary in embodiments of the present invention. Conventional spring loaded hanger arms can therefore be expensive to manufacture and replace, and they are typically difficult to install and assemble. Embodiments of the present invention are designed to overcome one or more of these problems.

Embodiments disclosed herein may improve upon conventional mudflap hanger assemblies in several ways. For instance, the interface between the mounting plate and frame seat is significantly improved, in that the contact region between the frame seat and the mounting plate extends into the mudflap hanger arm, where conventional designs do not. This allows the present embodiments to maintain guided motion when the mudflap hanger assembly is deflected. The guided motion helps to prevent the mounting plate from becoming dislodged with respect to the frame seat, and also helps to ensure that the assembly returns to its intended position after being deflected. The embodiments herein can also reduce or eliminate the amount of spring force which is required to return the hanger arm assembly to its undeflected position. These embodiments may also provide means for maintaining attachment of the hanger assembly to the vehicle in the event of a spring failure.

The mudflap hanger assembly designs disclosed herein further enable the use of alternate materials, or a combination of materials to gain further improvements. For example, while conventional mudflap hanger frame seat and mounting plates are made with steel, and it is necessary to weld the mounting plate to the mudflap hanger arm. The present embodiments provide for a mounting plate that is modified to receive a mudflap hanger sleeve without welding or other permanent joining techniques. Consequently, different materials for these two parts can be used, while eliminating a weld operation or other joining operation. The contact region between the mounting plate and the mudflap hanger arm extends into the mudflap hanger arm (by approximately one inch in an exemplary embodiment) while also enclosing the outer surface of the hanger arm, thereby contacting both inner and outer surfaces of the hanger arm. The mounting plate is held in position by the high-tension spring of the hanger arm assembly. Thus, without any joining operation at all, the present embodiments reduce or eliminate the possibility that the mounting plate and the hanger arm can fully separate while the hanger arm is being deflected.

Since the mounting plate and the frame seat in the present embodiments may be made with plastic, the opportunity for corrosion between the frame seat and the mounting plate may be reduced or eliminated without requiring a coating. Conventional mudflap hangers which are made with steel, on the other hand, generally need to utilize a coating process which often fails to prevent corrosion between the frame seat and the plate since the parts wear against one another. The present designs reduce the number of manufacturing processes (e.g., no welding or coating processes) and reduces cost, while also improving corrosion resistance. Further, since the frame seat (which mounts to the coated steel frame of the vehicle) may be made with plastic in the present embodiments, the opportunity for corrosion caused by metal to metal contact between the frame and the frame seat is reduced or eliminated, which may mitigate the need for a gasket between the frame and the frame seat, as typically used in conventional designs.

Figure 1:
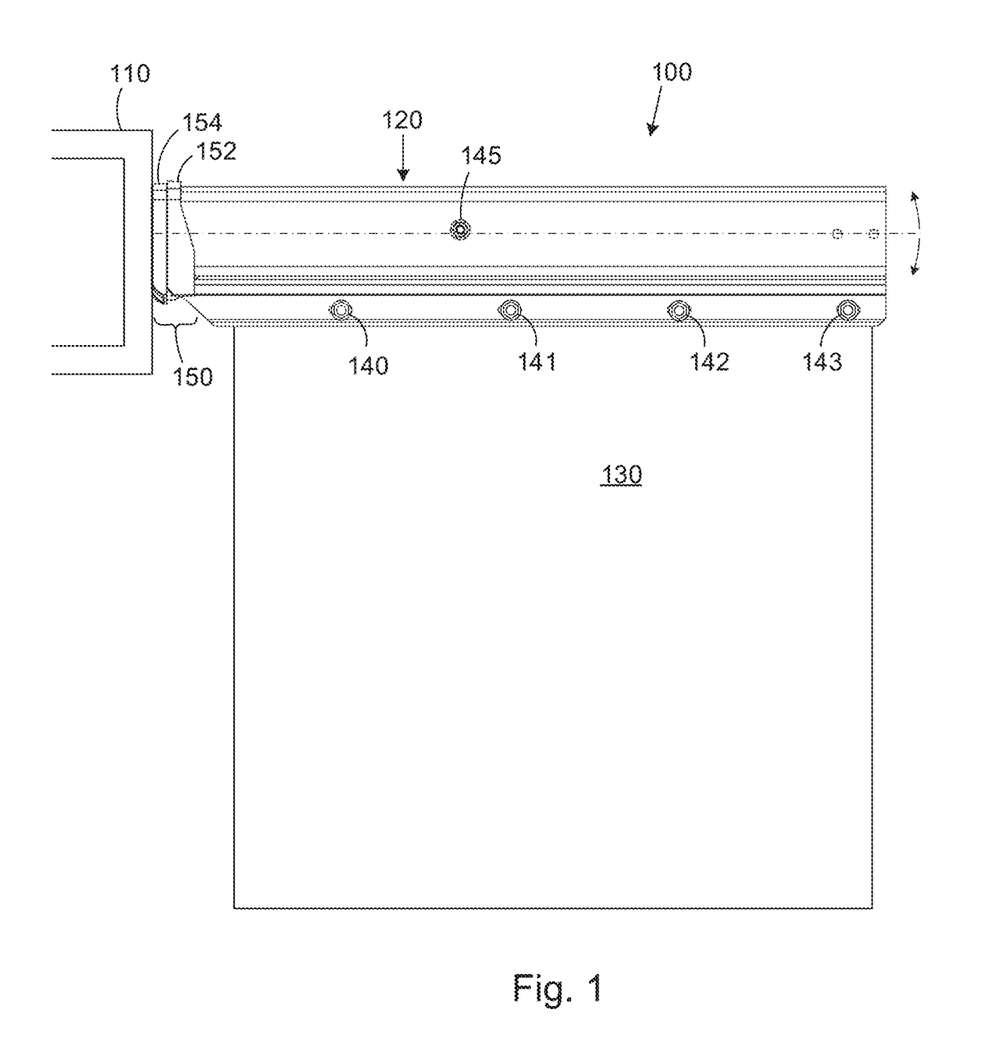
FIG. 1 is a diagram illustrating an exemplary mounted spring-loaded mudflap assembly in accordance with one embodiment.

Referring to FIG. 1, a diagram illustrating an exemplary mounted spring-loaded mudflap assembly in accordance with one embodiment is shown. In this embodiment, mudflap assembly 100 is mounted on the frame 110 of a vehicle. Mudflap assembly 100 has a hanger arm 120 to which mudflap 130 is attached. An upper edge of mudflap 130 is positioned within a slot at the bottom of hanger arm 120 and is secured in the slot by a set of screws 140-143. The proximal end of hanger arm 120 (i.e., the left end of the hanger arm, as depicted in the figure) is secured to frame 110 via a high tension spring (not shown in the figure) that is positioned within the tubular hanger arm. The proximal (left in the figure) end of the spring is connected to frame 110 by components 150, and the distal (right in the figure) and of the spring is secured to the hanger arm by a bolt 145 or similar structure positioned within the hanger arm. The tensioning of the spring causes hanger arm 120 to be biased against frame 110 to hold the hanger arm in position against the frame with the hanger arm extending away from the frame seat. More specifically, mounting plate 152 at the proximal end of hanger arm 120 is biased against frame seat 154, as will be discussed in more detail below. For purposes of this disclosure, the elongated direction of the hanger arm (to the right in the figure) may be referred to as the longitudinal direction, while directions perpendicular to the longitudinal direction may be referred to as lateral directions (e.g., up or down in the figure, or into and out of the figure).

Figure 2:
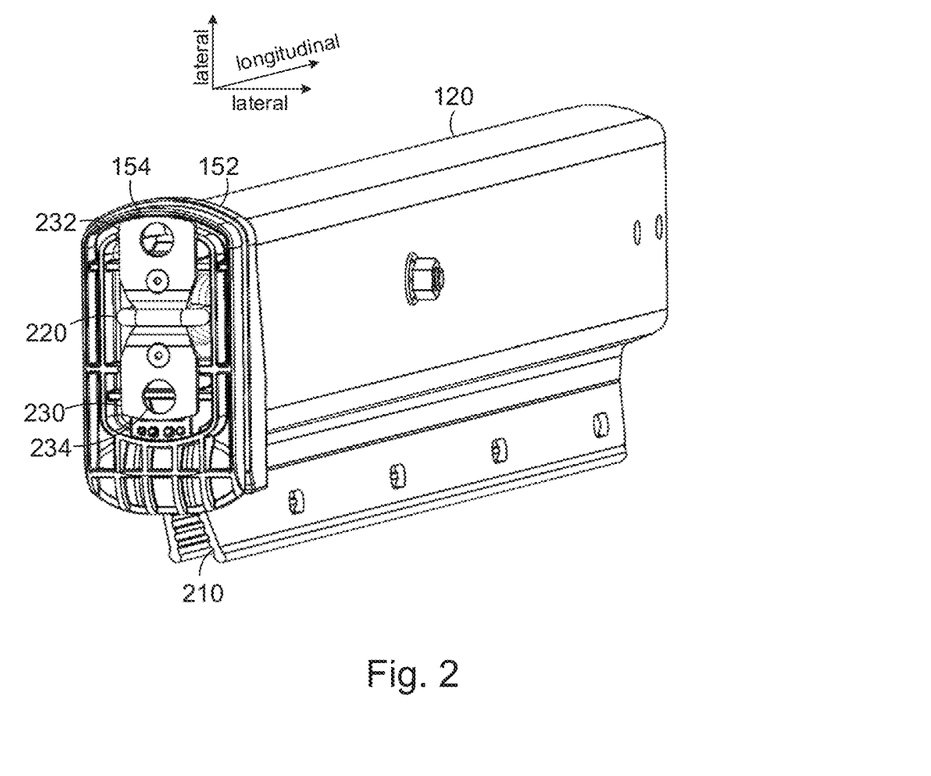
FIG. 2 is a diagram illustrating a perspective view of the unmounted hanger arm assembly of FIG. 1.

Referring to FIG. 2, a diagram illustrating a perspective view of the unmounted hanger arm assembly of FIG. 1 is shown. In this figure, the mudflap has been removed from the hanger arm to better illustrate the slot 210 within which the mudflap is secured. In this diagram the back side of frame seat 154 (the side which abuts the vehicle frame when mounted) is visible. It can be seen that a D ring 220 and a D ring mount 230 are provided on frame seat 154. When frame seat 154 is installed, D ring mount 230 is secured to the vehicle frame (using nuts and bolts that extend through the two larger holes 232 and 234). D ring 220 provides a mounting point for the high tension spring within the hanger arm. Frame seat 154 movably engages mounting plate 152 which is located at the proximal end of hanger arm 120. In other words, the mounting plate is held in position against the frame seat by the spring, but can move (e.g., pivot) away from the frame seat and is then pulled back into a resting position against the frame seat.

Figure 3A:
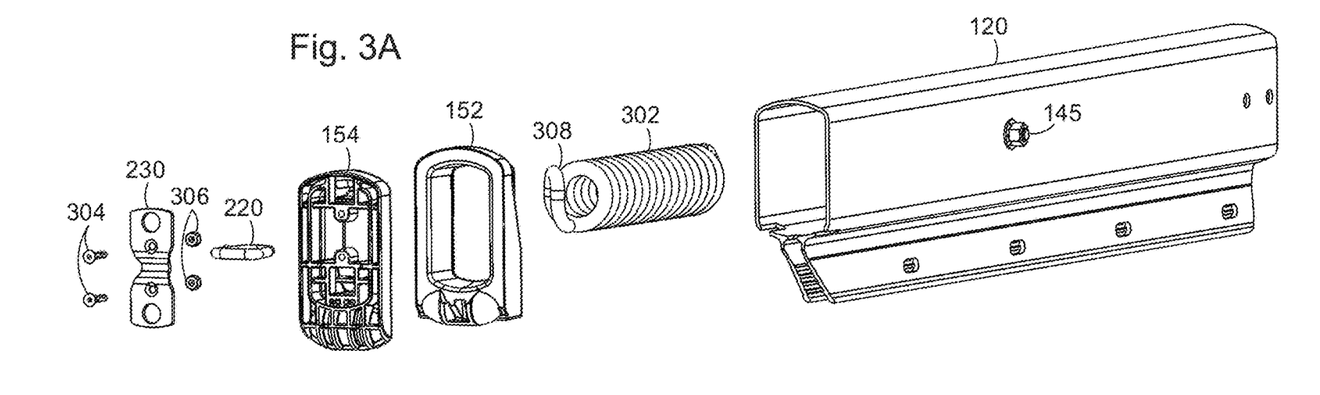
FIGS. 3A and 3B are a pair of diagrams illustrating exploded views of the hanger arm assembly of FIG. 1.
Figure 3B:
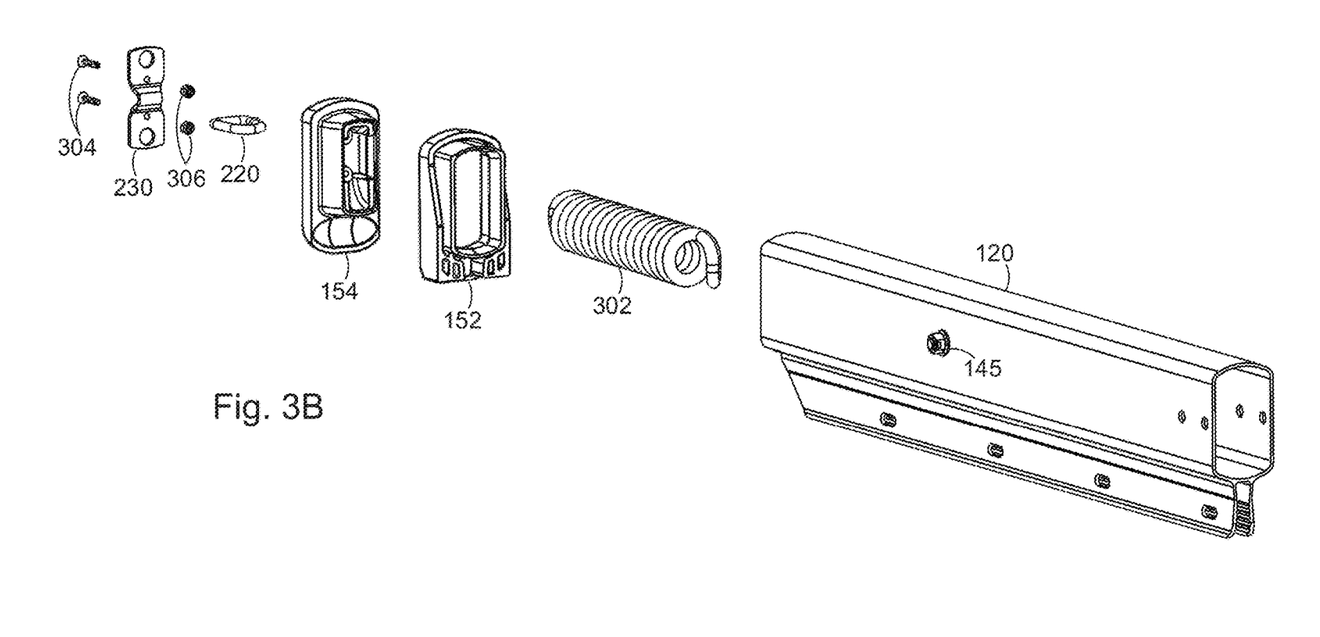

Referring to FIGS. 3A and 3B, a pair of diagrams illustrating exploded views of the hanger arm assembly of FIG. 1 are shown. FIG. 3A is a view from the proximal end of the exploded assembly, while FIG. 3B is a view from the distal end of the exploded assembly.

As noted above, the hanger arm assembly includes, from left to right in the figures, a D ring mount 230 which secures D ring 220 to the vehicle frame, frame seat 154, mounting plate 152 which, high tension spring 302, and hanger arm 120. D ring mount 230 is secured to the frame seat by bolts 304 and nuts 306. In this embodiment, nuts and bolts (not shown in the figure) extend through the larger holes in the D ring mount 230 so that the frame seat is also secured to the vehicle frame. High tension spring 302 extends through mounting plate 152 and has a hooked proximal end 308 which is positioned through D ring 220 to connect the spring to the vehicle frame. High tension spring 302 extends into hanger arm 120 and includes a hooked distal end 310 which, when assembled, hooks around and thereby secures the distal end of the spring to the hanger arm. When the apparatus is assembled, high tension spring 302 is tensioned to bias hanger arm 120 toward the vehicle frame (hence, toward D ring mount 230, D ring 220, frame seat 154 and mounting plate 152.

In its normal, resting position, the installed hanger arm 120 extends outward from the vehicle frame. In this embodiment, this direction is substantially normal to the surface of the vehicle frame at the point at which the hanger arm assembly is mounted, although it could extend outward at a different angle in alternative embodiments. When hanger arm 120 is deflected from this normal, resting position, it variably pivots around points (or axes) toward the outer edges of frame seat 154 and mounting plate 152 (as will be explained in more detail below), which increases the tension on high tension spring 302. The tension of the spring then pulls hanger arm 120 back toward its normal resting (undeflected) position.

Figure 4A:
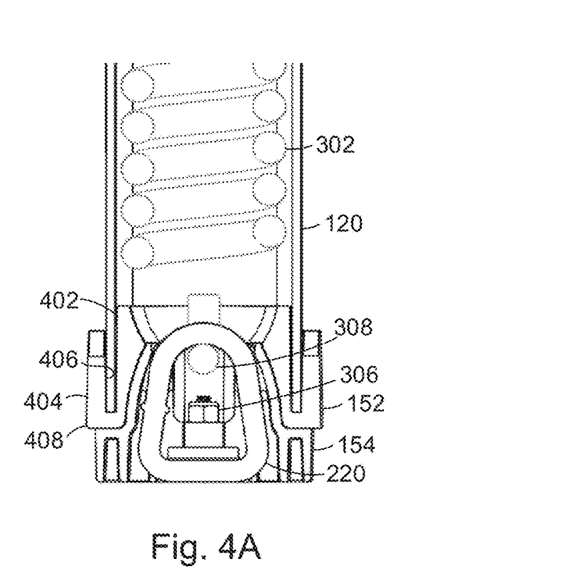
FIGS. 4A-4C are a set of diagrams illustrating the components of the hanger arm assembly of FIG. 1.
Figure 4B:
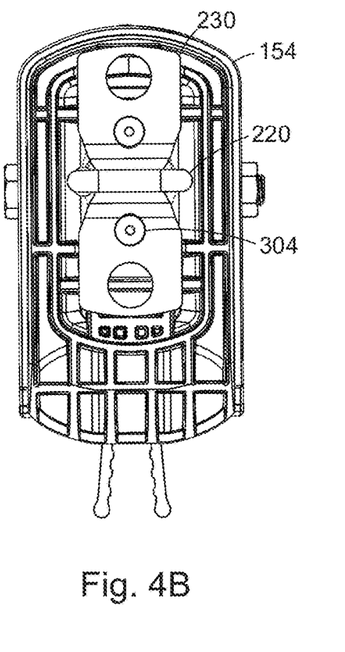
Figure 4C:
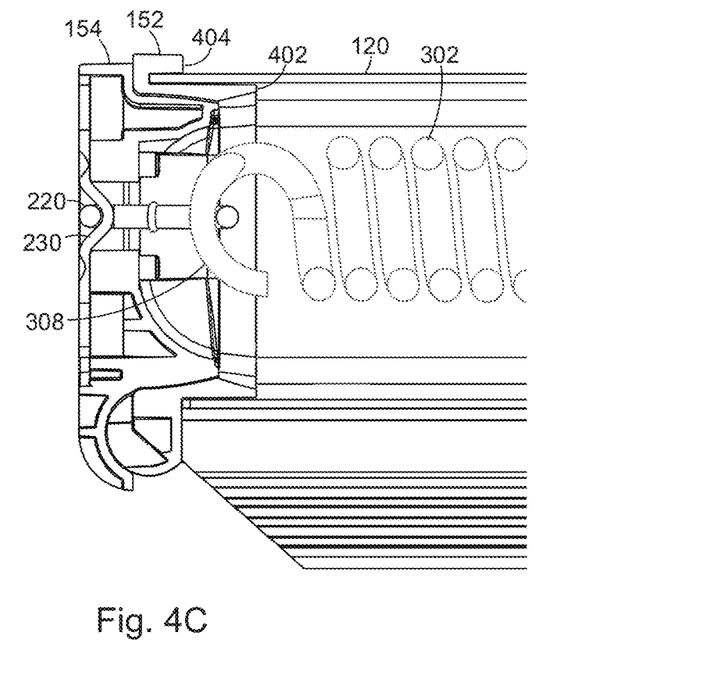

Referring to FIGS. 4A-4C, a set of diagrams illustrating the components of the hanger arm assembly are shown in more detail. FIG. 4A is a cross-sectional top view of the proximal end of the hanger arm assembly. FIG. 4B is an end view of the proximal end of the hanger arm assembly. FIG. 4C is a cross-sectional side view of the proximal end of the hanger arm assembly.

As noted above, conventional hanger arm assemblies use an end plate which is welded to the proximal end of the hanger arm. As shown in FIGS. 4A and 4C, mounting plate 152 is not simply a plate which is secured to hanger arm 120 by conventional means (e.g., welding), but is instead configured to fit over and within the proximal end of hanger arm 120. In other words, mounting plate 152 has an inner extension 402 and an outer extension 404 which extend distally from a face portion 408 of the mounting plate. Inner extension 402 is sized to fit within the end of tubular hanger arm 120, and outer extension 404 is sized to fit over the end of hanger arm 120. A slot 406 is formed between inner extension 402 and outer extension 404, and the proximal end of hanger arm 120 fits snugly within this slot. Because hanger arm 120 is positioned between inner extension 402 and outer extension 402 it provides support to the structure of mounting plate 152. In one embodiment, inner extension 402 extends approximately one inch into hanger arm 120, although the length of the inner extension (and outer extension 404) may vary in other embodiments.

As a result of the extruded shape provided by the end of hanger arm 120, mounting plate 152 can more easily be constructed from a plastic or similar material instead of metal, in part because the clamping force applied when attaching a mudflap does not alter the shape of the hanger arm where it joins the mounting plate. In some cases, the plastic mounting plate apart from the hanger arm may not be as strong as a metal mounting plate, but the combined structure of the mounting plate and the hanger arm may be sufficiently strong to maintain the structural integrity of the faceplate in the assembled structure. This provides a number of advantages, including the ability to more easily manufacture the mounting plate (e.g., using injection molding technologies), the ability to manufacture the mounting plate with more complex surfaces, preventing corrosion which normally results from the wear between a metal frame seat and metal mounting plate, eliminating the need to weld or otherwise permanently join the mounting plate to the hanger arm, reducing the weight of the mounting plate and hanger arm assembly, etc. Because the mounting plate is not permanently joined to the hanger arm, it can be easily removed and replaced if it becomes damaged or worn.

It should be noted that that the frame seat can be manufactured using the same plastic injection molding or other technologies that are used to form the mounting plate. Thus, the frame seat can achieve the same or similar advantages, including the ability for the frame seat to have more complex surfaces such as the guidance surfaces described herein. The use of plastic to manufacture the frame seat also prevents the corrosion inherent to metal components due to wear against the mounting plate, reducing the weight of the frame seat, etc.

Figure 5A:
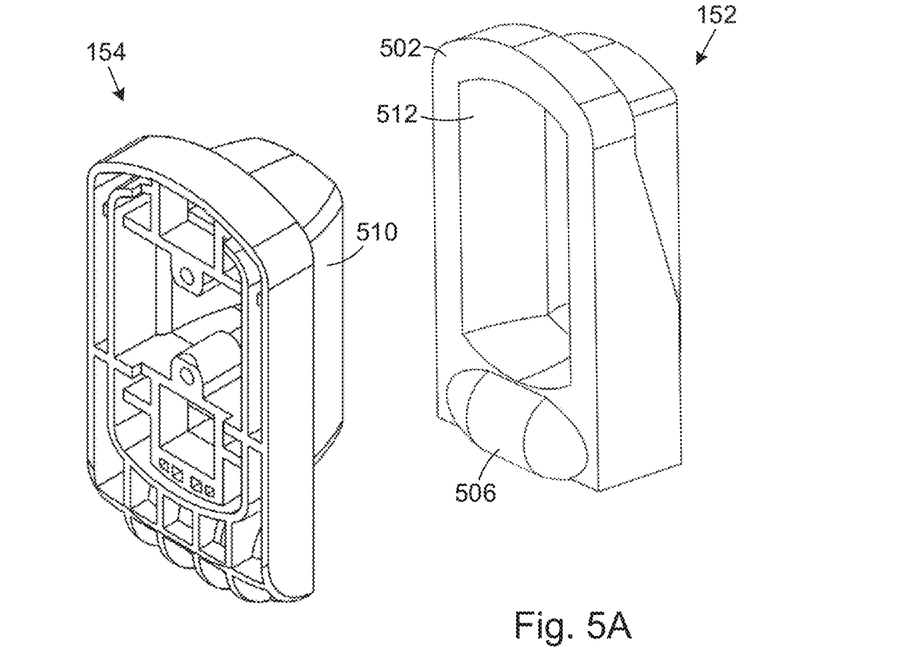
FIGS. 5A and 5B are a set of diagrams illustrating the mounting plate and frame seat of FIG. 1.
Figure 5B:
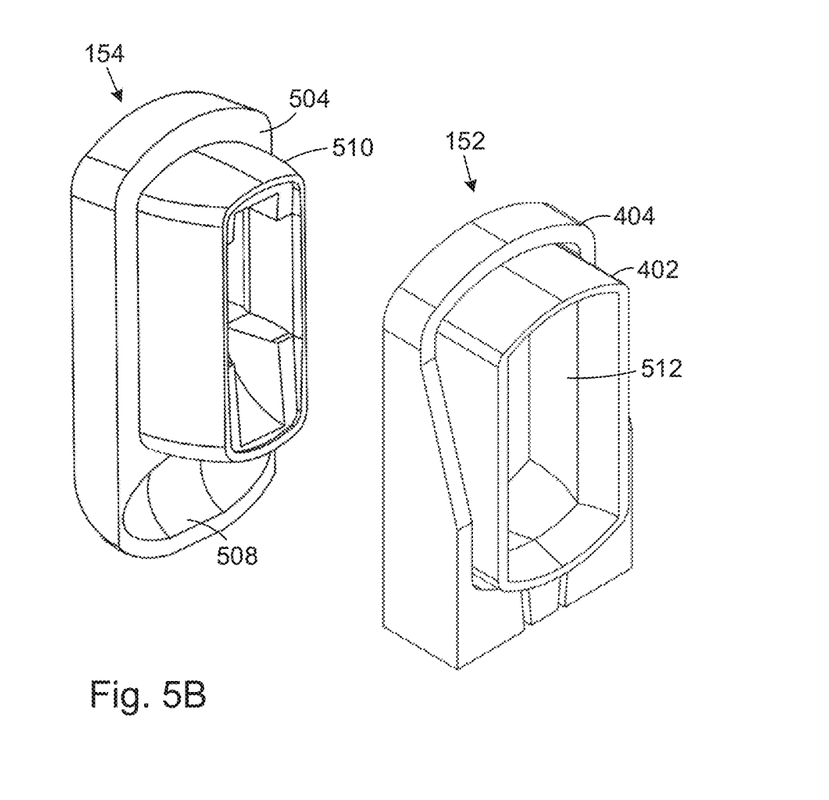

Referring to FIGS. 5A and 5B, mounting plate 152 and frame seat 154 are shown in more detail. FIG. 5A is a perspective view showing a proximal side of the components, while FIG. 5B is a perspective view showing a distal side of the components. In each of the figures, mounting plate 152 and frame seat 154 are oriented in their undeflected, resting positions, but are separated from each other to show the structures of the components.

Each of mounting plate 152 and frame seat 154 has a resting surface that is in contact with the resting surface of the other component when the hanger arm assembly is in an undeflected position. Resting surface 502 of mounting plate 152 can be seen in FIG. 5A, and resting surface 504 of frame seat 154 can be seen in FIG. 5B. In this embodiment, the resting surfaces are generally planar, except that mounting plate 152 has a generally oval, or football-shaped protrusion 506 which extends outward from the planar portion of resting surface 502, and frame seat 154 has a complementary concave oval shape 508 which is recessed from the planar portion of resting surface 504.

In addition to the resting surfaces of mounting plate 152 and frame seat 154, each of these components has a set of guidance surfaces. Frame seat 154 has a guidance surface 510 which extends distally outward from the planar portion of resting surface 504. Guidance surface 510 has a somewhat oval overall shape. At any point on guidance surface 510, it is slightly convex. Mounting plate 152 has a guidance surface 512 which is generally complementary to guidance surface 510, and which extends distally into the hanger arm (the hanger arm is not shown in these figures). Like guidance surface 510, guidance surface 512 also has a somewhat oval overall shape, but at any point on guidance surface 512, the surface is slightly concave.

The guidance surfaces oppose each other and are configured to remain in close contact (or nearly in contact) as the components pivot with respect to each other about some point (or axis) on the resting surfaces. The guidance surfaces thereby guide the pivoting motion of the components to follow a guided path of the pivoting motion. This prevents the components from being laterally displaced from each other as the components are pivoting. In this embodiment, the guidance surfaces also prevent the components from twisting with respect to each other. By preventing the twisting and displacement of the mounting plate with respect to the frame seat, the guidance surfaces maintain the proper positioning of the components so that they can pivot back to their normal resting position without binding. By maintaining proper alignment of the components, the guidance surfaces may also prevent excessive wear on the components.

Figure 6A:
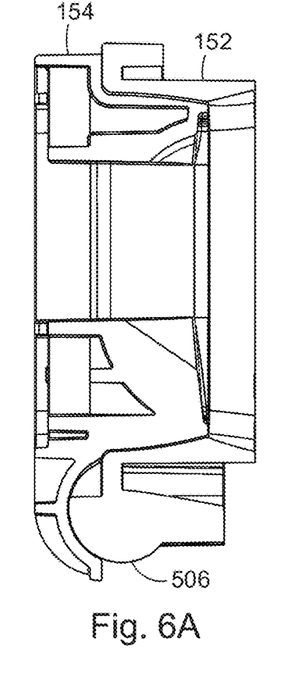
FIGS. 6A-6E are a set of diagrams illustrating cross-sectional views of the mounting plate and frame seat of FIG. 1.
Figures 6B, 6C:
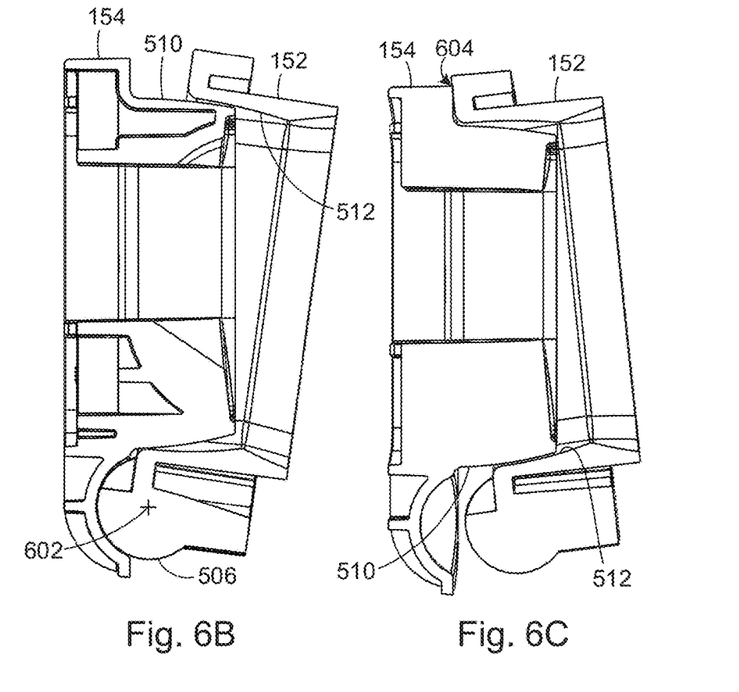
Figure 6D:
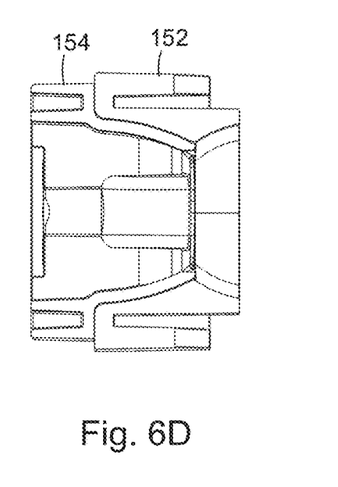
Figure 6E:
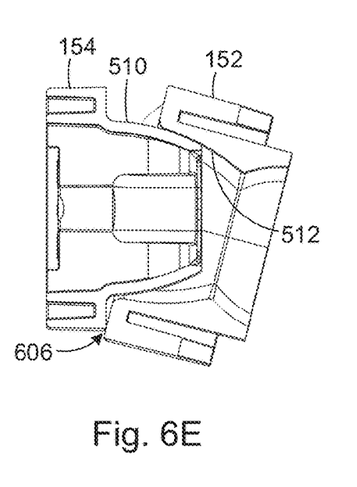

Referring to FIGS. 6A-6E, a series of cross-sectional views of mounting plate 152 and frame seat 154 are shown. FIG. 6A is a side view of the components in a resting position. FIG. 6B is a side view of the components pivoting about football shaped protrusion 506 and recess 508. FIG. 6C is a side view of the components pivoting about a point at the top of the resting surfaces. FIG. 6D is a top view of the components in a resting position. FIG. 6E is a top view of the components pivoting about a point at the side of the resting surfaces. These figures show that the mounting plate variably pivots, i.e., pivots around different points or axes.

Referring to FIGS. 6A and 6D, faceplate 152 is shown in a resting position against frame seat 154. In this position, resting surface 502 (see also FIG. 5A) of mounting plate 152 is fully seated against resting surface 504 (see also FIG. 5B) of frame seat 154. That is, the two components are in contact across substantially the entirety of the resting surfaces. In this position, guidance surface 510 of frame seat 154 extends distally outward from the frame seat and partially through mounting plate 152. Guidance surfaces 510 and 512 in the resting position may be in contact with each other, or they may be in very close proximity to each other (i.e., the gap between the surfaces may be within a predetermined tolerance). The high-tension spring of the hanger arm assembly biases mounting plate 152 against frame seat 154 and holds the components in this position, absent any deflecting force applied to the assembly, and particularly the hanger arm. Guidance surfaces 510 and 512 prevent mounting plate 152 from moving laterally (up and down in FIGS. 6A-6E) with respect to frame seat 154, keeping the mounting plate centered and properly oriented in the resting position.

Referring to FIG. 6B, the positions of the mounting plate and frame seat are shown when a downward force is applied to the hanger arm, causing it to pivot downward. Mounting plate 152, which is secured to the end of the hanger arm, pivots (clockwise in the figure) about an axis near the bottom of the mounting plate, substantially at the center of football-shaped protrusion 508. The surfaces of protrusion 506 and recess 508 have substantially the same radius of curvature, and a large contact area is maintained between the surfaces as mounting plate 152 pivots away from frame seat 154. In one embodiment, frame seat 154 extends far enough into mounting plate 152 that contact between the guidance surfaces remain in contact when the mounting plate is deflected by some amount (e.g., at least 2 degrees) up to 30 degrees. The complementary surfaces can also help to maintain the respective lateral positions of the components if the mounting plate pivots to a degree that the guidance surfaces do not remain in contact (or in close proximity), as will be discussed in more detail below.

As noted above, in the scenario depicted in FIG. 6B, mounting plate 152 is pivoting around an axis 602 near the center of curvature of protrusion 506. It can be seen that, on the opposite side of mounting plate, guidance surface 512 slides to the right, along guidance surface 510 of the frame seat. As noted above, the guidance surfaces may be in contact with each other, or they may be in near-contact with each other. In this embodiment, each of guidance surfaces 510 and 512 is curved, with a radius of curvature that is approximately equal to the distance between the respective surface and axis 602. This allows the contact or gap between the surfaces to be maintained as the mounting plate pivots.

Because the guidance surfaces remain in contact with each other (see the overlap between the right end of guidance surface 510 with the left end of guidance surface 512 at the top of FIG. 6B, mounting plate 152 is prevented from being laterally displaced downward with respect to frame seat 154. Portions of the guidance surfaces on the left and right of the mounting plate and frame seat likewise prevent the mounting plate from being laterally displaced in a horizontal direction with respect to frame seat. Thus, when the displacing force is removed from the hanger arm, mounting plate 152 can easily pivot back to the resting position shown in FIG. 6A without binding. Put another way, guidance surfaces 510 and 512 help to guide the pivoting movement of mounting plate 152 with respect to frame seat 154 so that it follows a specific path as it moves.

For purposes of clarity, the description herein generally refers to "contact" between the guidance surfaces, but this should be construed as including both actual contact between the surfaces and near-contact, in which the surfaces are not technically in contact with each other, but remain within a predetermined gap distance of each other.

Referring to FIG. 6C, mounting plate 152 and frame seat 154 are shown with the mounting plate pivoted slightly in a counterclockwise direction. This corresponds to an upward force being applied to the hanger arm. In this scenario, mounting plate 152 pivots about an axis or pivot point 604 at the upper end of the mounting plate and frame seat. Guidance surfaces 510 and 512 on the opposite side of the mounting plate and frame seat are curved, with a radius of curvature substantially equal to the distance between the respective surfaces and axis 604, so that the surfaces remain in contact (or near-contact) when the mounting plate pivots with respect to the frame seat. As in the example of FIG. 6B, the contact between the guidance surfaces prevents the mounting plate from being displaced upward when the mounting plate is in this pivoted position. (Contact between the upper portion of the guidance surfaces prevents the mounting plate from being displaced downward.) Thus, guidance surfaces 510 and 512 again causes mounting plate 152 to move along a known path as it pivots around axis 604 and allows the mounting plate to return from the pivoted position to the resting position without binding, and without allowing the mounting plate to be laterally displaced with respect to the frame seat.

Referring to FIG. 6E, mounting plate 152 and frame seat 154 are shown with the mounting plate pivoted slightly in a counterclockwise direction. Because this is a top view of the components, this corresponds to the hanger arm being deflected horizontally (downward in the figure). Similar to the example of FIG. 6C, mounting plate 152 pivots on an axis or pivot point 606 which is formed between the generally planar resting surfaces at the sides of the mounting plate and frame seat 154. The portions of guidance surfaces 510 and 512 on the side of the components opposite axis 606 are curved, with a radius of curvature substantially equal to the distance between the respective surfaces and axis 606. This allows the contact or gap between the guidance surfaces to be maintained as the mounting plate pivots, guiding the movement of the mounting plate and preventing it from being laterally displaced from the frame seat.

In the embodiment described above, mounting plate 152 and frame seat 154 include a protrusion 506 and complementary recess 508 at the lower ends of the respective components, while on the other three sides of the mounting plate and frame seat, the components are allowed to pivot about a point or axis on the generally planar resting surface. When mounting plate 152 pivots at protrusion 506 and recess 508, the complementary surfaces of these features serve several purposes. For instance, this distributes the associated stresses over a greater area, which may reduce the wear of the contacting surfaces. The complementary surfaces also provide additional resistance to the lateral movement (up or down) of mounting plate 152 with respect to frame seat 154. It may be possible, in alternative embodiments, to provide similar features on more than one side of the mounting plate and frame seat components. By the same token, it would be possible, in alternative embodiments, to implement the pivoting mechanism of FIGS. 6B, 6C and 6E on more than three sides of the mounting plate and frame seat (i.e. on top, bottom, right and left sides, omitting the protrusion and recess features included on the bottom of the embodiment described above).

Figure 7A:
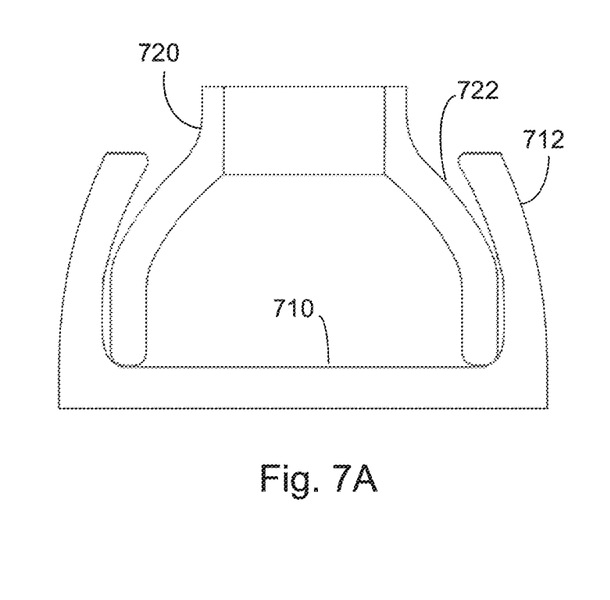
FIGS. 7A and 7B are a set of diagrams illustrating a frame seat that partially encloses a mounting plate in accordance with an alternative embodiment.
Figure 7B:
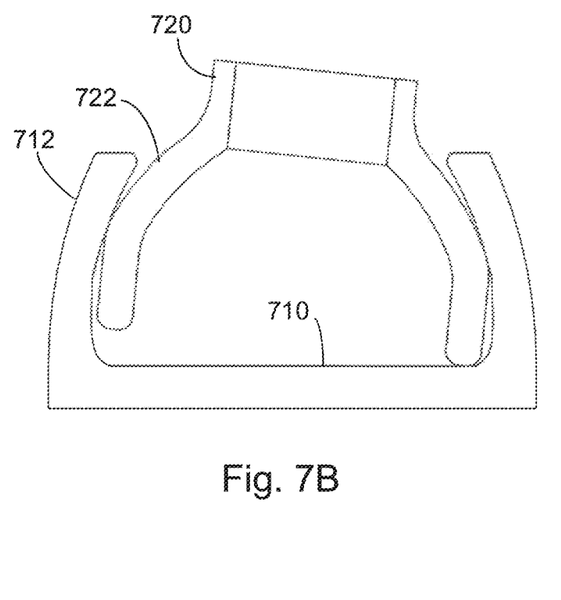

It will be appreciated that one or more of the elements depicted in the drawings/figures can also be implemented in a more separated or integrated manner, or even removed or rendered as inoperable in certain cases, as is useful in accordance with a particular application. As one example of integrating elements, the mounting plate and the hanger arm may be integrated as a single plastic injection molded part. As another example of eliminating elements or rendering elements inoperable, the spring may be removed or the spring tension may be reduced by reversing the direction of curvature of the frame seat guiding surfaces and the mounting plate guiding surfaces, thereby allowing the frame seat to partially enclose the mounting plate. This is illustrated in the diagrams of FIGS. 7A and 7B. FIG. 7A shows the frame seat and mounting plate in a normal, undeflected position. FIG. 7B shows the components with the mounting plate deflected approximately 6 degrees relative to the frame seat.

Referring to FIGS. 7A and 7B, when the frame seat 710 partially encloses the mounting plate 720, the outer surfaces of walls 722 of the mounting plate engage (or nearly engage) the inner surfaces of curved walls 712 of the frame seat. When no deflecting force is applied to the hanger arm and mounting plate, the frame seat inside corners bias the mounting plate toward a centered operating position (see FIG. 7A). When a force is applied to the mudflap hanger assembly, the assembly pivots (see FIG. 7B). After a given amount of deflection, the walls of the mounting plate contact the walls of the frame seat and cause the mounting plate to move along a guided contact path determined by the geometry of the frame seat. In this embodiment, as the mounting plate rotates, the contact between the walls of the mounting plate and the frame seat provides additional force which helps the spring bias the assembly back to the normal, undeflected position. In some embodiments, it may be possible to use this bias mechanism to eliminate the spring or reduce the spring tension. Another advantage of this design is that if the spring fails, the mounting plate is retained by the frame seat, so that the mudflap hanger assembly will not fall off the vehicle.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A mudflap hanger apparatus adapted to be mounted on a vehicle, the apparatus comprising:
   a hanger arm assembly having a hanger arm and a mounting plate connected to a proximal end of the hanger arm, wherein the hanger arm comprises a tubular structure having a proximal opening;
   a frame seat configured to movably engage the mounting plate; and
   a spring coupled to the hanger arm assembly and the frame seat, wherein the spring biases the mounting plate toward a resting position against the frame seat;
   wherein when a lateral force is applied to the hanger arm, the mounting plate variably pivots against the frame seat at one of a plurality of pivot axes, enabling the hanger arm to move angularly away from a resting position of the hanger arm;
   wherein each of the mounting plate and the frame seat has one or more corresponding guidance surfaces, wherein the one or more guidance surfaces of the mounting plate oppose the one or more guidance surfaces of the frame seat, wherein a portion of the mounting plate extends into the hanger arm, wherein the portion of the mounting plate extending into the hanger arm includes at least a portion of the one or more guidance surfaces of the mounting plate; and
   wherein when the mounting plate pivots against the frame seat at the one of a plurality of pivot axes, the one or more guidance surfaces of the mounting plate and the one or more guidance surfaces of the frame seat cause the mounting plate to move along a corresponding guided pivot path.

2. The mudflap hanger apparatus of claim 1, wherein the hanger arm surrounds and supports the portion of the mounting plate extending into the hanger arm.

3. The mudflap hanger apparatus of claim 1, wherein in the resting position at least a portion of the one or more guidance surfaces of the frame seat extend into the hanger arm.

4. The mudflap hanger apparatus of claim 1, wherein in the resting position, a first resting surface of the mounting plate is fully seated against a second resting surface of the frame seat and the hanger arm extends distally from the frame seat in a longitudinal direction.

5. The mudflap hanger apparatus of claim 4, wherein the first resting surface of the mounting plate and the second resting surface of the frame seat comprise substantially planar surfaces.

6. The mudflap hanger apparatus of claim 4, wherein each of the first resting surface and the second resting surface includes a planar portion, wherein one of the first resting surface and the second resting surface includes a protrusion on a lower end of the resting surface and the other of the first resting surface and the second resting surface includes a recess which is complementary to the protrusion, and wherein the mounting plate is configured to pivot about the protrusion while the protrusion remains seated within the recess.

7. The mudflap hanger apparatus of claim 1, wherein for one or more of the plurality of pivot axes, the mounting plate has a corresponding guidance surface on a side of the mounting plate opposite the pivot axis and the mounting plate has a corresponding guidance surface on a side of the frame seat opposite the pivot axis; wherein the corresponding guidance surface of the mounting plate and the corresponding guidance surface of the frame seat have complementary curved surfaces; wherein the corresponding guidance surface of the mounting plate has a radius of curvature equal to a distance between the pivot axis and the corresponding guidance surface of the mounting plate; and wherein the corresponding guidance surface of the frame seat has a radius of curvature approximately equal to a distance between the pivot axis and the corresponding guidance surface of the frame seat.

8. The mudflap hanger apparatus of claim 1, wherein the hanger arm comprises a metal extrusion and the mounting plate comprises a thermoplastic material.

9. The mudflap hanger apparatus of claim 8, wherein the hanger arm comprises a tubular structure, wherein the mounting plate comprises an inner extension that extends distally into a proximal end of the tubular structure and an outer extension that extends distally exterior to the proximal end of the tubular structure, wherein a slot is formed between the inner extension and the outer extension, and wherein the proximal end of the tubular structure is positioned within the slot.

10. The mudflap hanger apparatus of claim 8, wherein the mounting plate comprises an injection molded plastic component.

11. The mudflap hanger apparatus of claim 8, wherein the frame seat comprises a thermoplastic material.

12. The mudflap hanger apparatus of claim 11, wherein the frame seat comprises an injection molded plastic component.

13. The mudflap hanger apparatus of claim 1, wherein the frame seat is connected to a D ring and a D ring mount, wherein the D ring mount secures the D ring to the frame seat and a vehicle frame, and wherein the D ring secures a proximal end of the spring to the frame seat and the vehicle frame.

14. The mudflap hanger apparatus of claim 13, wherein at least one of the D ring and the spring extends through an opening in the mounting plate.

15. The mudflap hanger apparatus of claim 14, wherein a distal end of the spring is secured within an interior of the hanger arm by a bolt that extends laterally through the hanger arm.

16. The mudflap hanger apparatus of claim 1, further comprising a U-bolt that extends through the frame seat and secures the frame seat and a proximal end of the spring to a vehicle frame.

17. A mudflap hanger apparatus adapted to be mounted on a vehicle, the apparatus comprising:
- a hanger arm assembly having a hanger arm and a mounting plate connected to a proximal end of the hanger arm, wherein the hanger arm comprises a tubular structure having a proximal opening;
- a frame seat configured to movably engage the mounting plate, wherein each of the mounting plate and the frame seat has one or more corresponding guidance surfaces, wherein the one or more guidance surfaces of the mounting plate oppose the one or more guidance surfaces of the frame seat;
- a spring coupled to the hanger arm assembly and the frame seat, wherein the spring biases the mounting plate toward a resting position against the frame seat;
- wherein when a lateral force is applied to the hanger arm, the mounting plate variably pivots against the frame seat at one of a plurality of pivot axes, enabling the hanger arm to move angularly away from a resting position of the hanger arm; and
- wherein while the mounting plate is pivoted against the frame seat by greater than 2 degrees and less than 30 degrees about a pivot axis, the mounting plate continues to extend into the hanger arm, wherein the portion of the mounting plate extending into the hanger arm and includes at least a portion of the one or more guidance surfaces of the mounting plate.

18. The mudflap hanger apparatus of claim 17, wherein the hanger arm surrounds and supports the portion of the mounting plate extending into the hanger arm.

19. The mudflap hanger apparatus of claim 17, wherein in the resting position at least a portion of the one or more guidance surfaces of the frame seat extend into the hanger arm.

* * * * *